(12) United States Patent
Henry

(10) Patent No.: US 7,847,349 B2
(45) Date of Patent: Dec. 7, 2010

(54) SINGLE-CYCLE FFT BUTTERFLY CALCULATOR

(75) Inventor: Matthew R. Henry, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 423 days.

(21) Appl. No.: 11/982,228

(22) Filed: Oct. 31, 2007

(65) Prior Publication Data

US 2009/0112959 A1    Apr. 30, 2009

(51) Int. Cl.
 H01L 29/94      (2006.01)
 H01L 23/62      (2006.01)
 H01L 21/8238    (2006.01)

(52) U.S. Cl. .................. 257/338; 257/320; 438/217; 438/228

(58) Field of Classification Search .................. 257/338, 257/370; 438/228, 217
See application file for complete search history.

(56) References Cited

U.S. PATENT DOCUMENTS 6,662,367 B2 * 12/2003 Dapper et al. ............... 725/105

* cited by examiner

*Primary Examiner*—Long Pham
*Assistant Examiner*—Steven H Rao

(57) ABSTRACT

In accordance with exemplary embodiments, a Fast Fourier Transform (FFT) architecture includes elements that perform a radix-2 FFT butterfly in one processor clock cycle at steady state. Some exemplary implementations of the FFT architecture incorporate register and data path elements that relieve memory bandwidth limitations by pairing operands consumed by and results generated by two adjacent butterflies in the overall N-point FFT operation.

17 Claims, 3 Drawing Sheets

SINGLE-CYCLE FFT BUTTERFLY CALCULATOR

BACKGROUND OF THE INVENTION

1. Field of the Invention

The present invention relates to digital signal processing, and, in particular, to implementation of Fast-Fourier Transform (FFT) butterfly calculation.

2. Description of the Related Art

Programmable digital signal processor implementations exhibit modest performance relative to dedicated hardware digital signal processor implementations when calculating a Fast Fourier Transform (FFT). Mobile communications systems require fast FFT calculation within a programmable processor platform that performs a variety of other digital signal processing and control duties. One desirable operation of fast FFT calculation is to perform the kernel calculation of the FFT, known as the radix-2 butterfly, in a single processor clock cycle.

The complex radix-2 butterfly requires the following calculations of equations (1a) and (1b):

$$A_{n+1} = A_n + B_n * W^k \text{ and} \tag{1a}$$

$$B_{n+1} = A_n - B_n * W^k, \tag{1b}$$

where $A_n$ and $B_n$ are complex coefficient values at stage n, and $W^k$ is a complex-valued coefficient commonly known in the art at the "twiddle factor". The twiddle factor refers to the trigonometric constant coefficients $W^k$, k=0, 1, 2, . . . , K, that are multiplied by the data in the course of the algorithm. The coefficients are root-of-unity complex multiplicative constants in the butterfly operations of the Cooley-Tukey FFT algorithm, well-known in the art of signal processing, that are employed to, recursively combine smaller discrete Fourier transforms.

Each butterfly calculation has two inputs ($A_n$ and $B_n$) and two outputs ($A_{n+1}$ and $B_{n+1}$). The overall butterfly calculation requires one complex multiplication, one complex addition, and one complex subtraction. Defining the real components (AR, BR) and imaginary components (AI, BI) of the coefficients individually, the equation (1a) and (1b) expand to the following equations (1a') and (1b'):

$$(AR+j\,AI)_{n+1} = (AR+j\,AI)_n + (BR+j\,BI)_n * (WR^k + j\,WI^k) \tag{1a'}$$

$$(BR+j\,BI)_{n+1} = (AR+j\,AI)_n - (BR+j\,BI)_n * (WR^k + j\,WI^k) \tag{1b'}$$

Typically, programmable architectures perform the FFT butterfly in 2 clock cycles. Other solutions accelerate the FFT by using a higher radix implementation of the algorithm on a Very Long Instruction Word (VLIW) machine. In either case, these architectures exhibit one or more of the following weaknesses: inferior performance, an inflexible hard-wired architecture, the need for a large register set and therefore wider instruction words, and/or the use of a higher FFT radix, all of which sacrifice flexibility in the size of the FFT operation performed (herein, "size" of the FFT refers to the value N of the N-point FFT algorithm, where N is the integer number of input/output data points).

FIG. 1 illustrates a data structure associated with an N-point FFT where N is eight. In FIG. 1, each of circles 102(a)-(d), 103(a)-(d), and 104(a)-(d) represents a butterfly calculation, and the input complex data points from memory are numbered 0 through 7. A butterfly calculation is performed, for example, by 102(a) on input data points 0 and 4. In all stages 0, 1, and 2 (i.e., all stages except the last stage 3), each butterfly calculation receives inputs from, and provides outputs to, non-adjacent memory addresses. Input data gathering and result data scattering illustrated by FIG. 1 complicates efficient processing of an FFT under the constraints of practical circuit design.

SUMMARY OF THE INVENTION

In one embodiment, the present invention generates updated Fast Fourier Transform (FFT) coefficients with a butterfly by reading a twiddle factor, reading a first A coefficient and a first B coefficient for a current stage; updating a product register value including the step of multiplying the first B coefficient with the twiddle factor; and deriving a first pair of updated FFT coefficients for a subsequent stage with add/subtract operations based on the first A coefficient, first B coefficient, and the product register value.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with exemplary embodiments of the present invention, a Fast Fourier Transform (FFT) architecture includes elements that perform a radix-2 FFT butterfly in one processor clock cycle, and some exemplary implementations of the FFT architecture incorporate register and data path elements that relieve memory bandwidth limitations by pairing operands consumed by and results generated by two adjacent butterflies in the overall N-point FFT operation.

The complex radix-2 FFT butterfly requires the following calculations of equations (1a) and (1b), repeated below as:

$$A_{n+1} = A_n + B_n * W^k \text{ and} \tag{1a}$$

$$B_{n+1} = A_n - B_n * W^k, \tag{1b}$$

where $A_n$ and $B_n$ are complex coefficient values at discrete time n, and twiddle factor $W^k$ is a complex-valued coefficient of the trigonometric constant coefficients $W^k$, k=0, 1, 2, . . . , K. Defining the real components (AR, BR) and imaginary components (AI, BI) of the coefficients individually, equations (1a) and (1b) might further be decomposed into the following equations (2a) through (2d):

$$AR_{n+1} = AR_n + (BR_n * WR^k) - (BI_n * WI^k) \tag{2a}$$

$$BR_{n+1} = AR_n - (BR_n * WR^k) + (BI_n * WI^k) \tag{2b}$$

$$AI_{n+1} = AI_n + (BI_n * WR^k) + (BR_n * WI^k) \tag{2c}$$

$$BI_{n+1} = AI_n - (BI_n - WR^k) - (BR_n * WI^k) \tag{2d}$$

These equations (2a) through (2d) illustrate that the complex butterfly requires four distinct 2-operand multiplications and four distinct 3-operand additions/subtractions.

Figure 2:
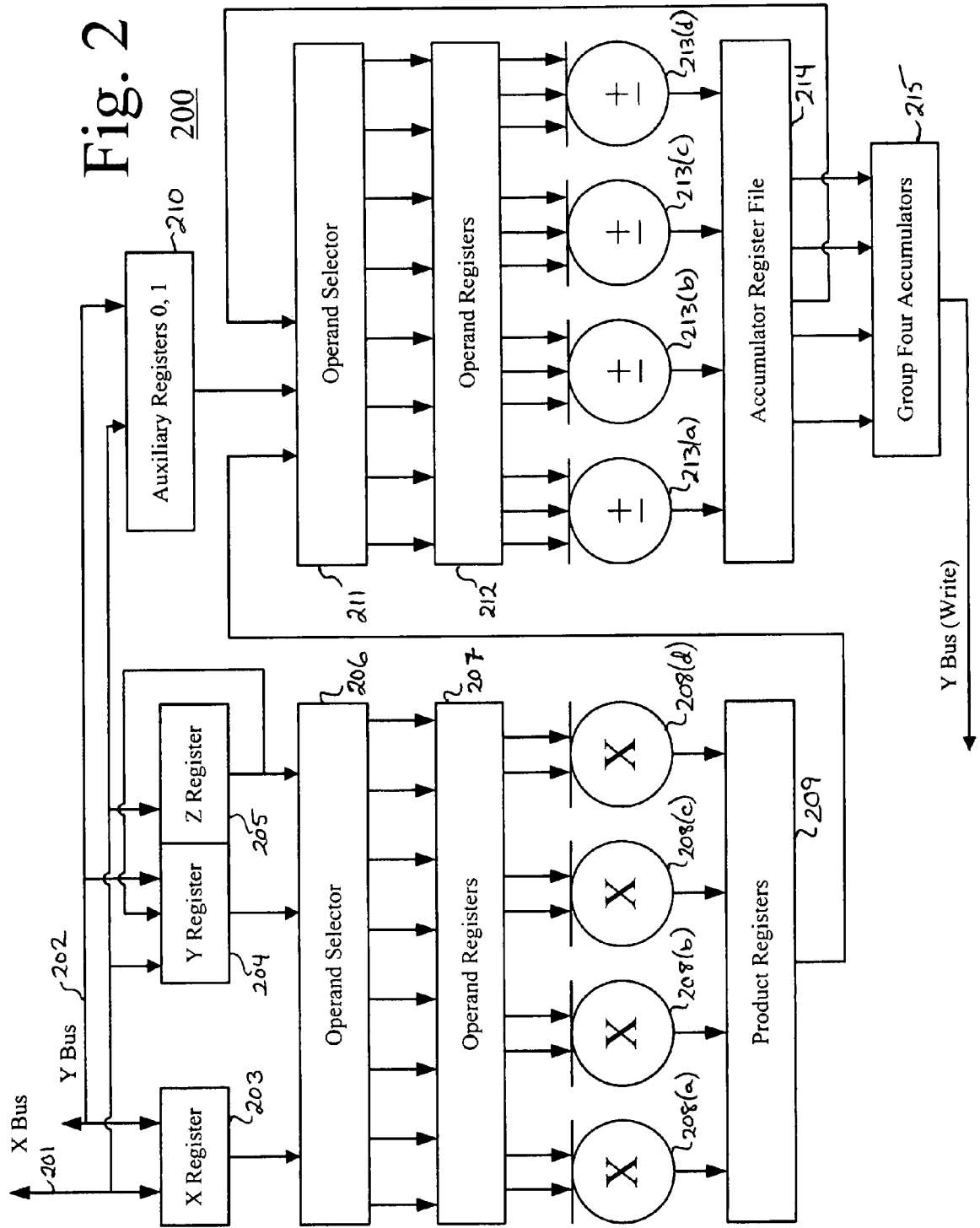
FIG. 2 shows a block diagram of a radix-2 FFT butterfly architecture in accordance with an exemplary embodiment of the present invention.

FIG. 2 shows a block diagram of a radix-2 FFT butterfly system 200 in accordance with an exemplary embodiment of the present invention. Butterfly system 200 comprises X register 203, Y register 204, Z register 205, and auxiliary registers (0,1) 210 coupled to X bus 201 and Y bus 202. X register 203, Y register 204, Z register 205, and auxiliary registers (0,1) 210 store input data and calculation results for the complex radix-2 FFT butterfly computation. Such input data and calculation results are provided to/from X register 203, Y register 204, Z register 205, and auxiliary registers (0,1) 210 by X bus 201 and Y bus 202.

X register 203, Y register 204, and Z register 205 provide stored data to operand selector 206. Operand selector 206 selects the particular complex radix-2 FFT butterfly computation operand to be performed on the received input data (e.g., as described above for equations (2a)-(2d)) and provides the results to operand registers 207 for storage. Results stored in operand registers 207 are provided to corresponding multipliers 208(a)-208(d) to provide the 2-operand multiplications of the complex radix-2 FFT butterfly computations (e.g., as described above for equations (2a)-(2d)). The output values from multipliers 208(a)-208(d) are then stored in product registers 209.

Product registers 209, auxiliary registers (0,1) 210, and accumulator register file 214 provide stored data to operand selector 211. Operand selector 206 selects the particular complex radix-2 FFT butterfly computation operand to be performed on the received input data and provides the results to operand registers 212 for storage. Results stored in operand registers 212 are provided to corresponding combiners 213(a)-213(d) to provide the 3-operand additions/subtractions of the complex radix-2 FFT butterfly computations (e.g., as described above for equations (2a)-(2d)). The output values from combiners 213(a)-213(d) are then stored in accumulator register file 214.

Once the complex radix-2 FFT butterfly computation is finished, the result is four complex coefficients representing the real and imaginary parts of the updated $A_{n+1}$ and $B_{n+1}$ coefficients as described above for equations (1a) and (1b). The real and imaginary parts of the updated $A_{n+1}$ and $B_{n+1}$ intermediate or result data points are provided by accumulator register file 214 to group four accumulators 215.

The arithmetic data path of the radix-2 FFT butterfly system 200 in accordance with exemplary embodiments of the present invention might comprise the following characteristics. System 200 allows for algorithmic pipelining of the multiply and add/subtract (accumulate) steps across two clock cycles but does not pipeline any of the atomic arithmetic operations themselves. Arithmetic elements directly compute the four multiplications and four 3-operand additions/subtractions to complete a butterfly calculation. 3-operand adder/subtractors (e.g., combiners 213(a)-213(d)) balance delay characteristics of corresponding multipliers (e.g., multipliers 208(a)-208(d)) within the pipeline while reducing an overall number of atomic operations in the butterfly (versus using a larger number of 2-operand adder/subtractors). Each 3-operand adder/subtractor also operates a 2-operand adder/subtractor for other algorithms that might share the circuitry of system 200.

Figure 1:
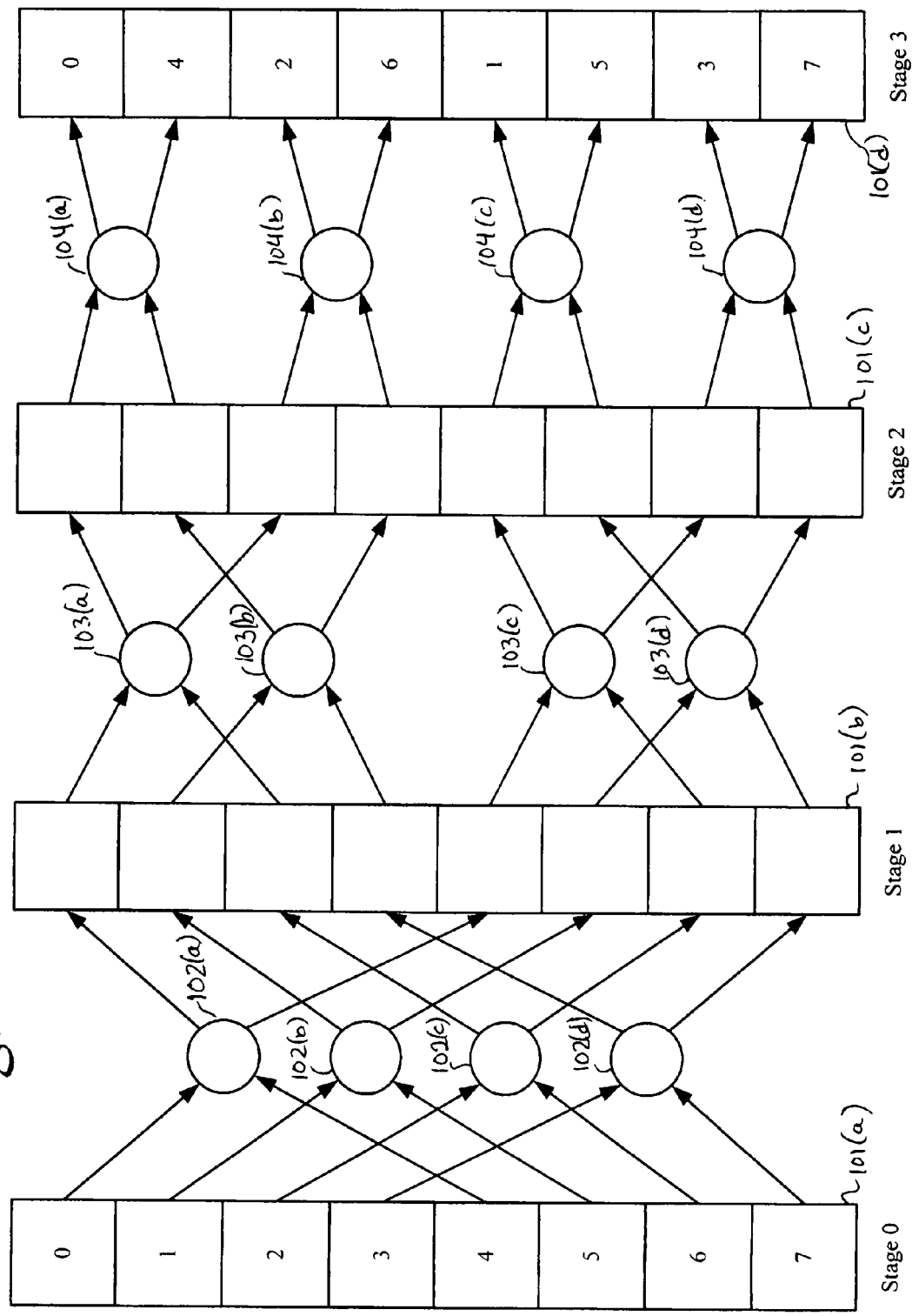
FIG. 1 illustrates a data structure associated with an N-point FFT where N is eight.

X register 203, Y register 204, and Z register 205 each accept a complex data value having a real part and an imaginary part. X register 203 receives twiddle factor $W^k$ and Y register 204 and Z register 205 receive consecutive input data values $B[(N/2)+p]_n$ and $B[(N/2)+p+1]_n$ respectively, where N is the size of the N-point FFT, n is the stage, p is an index value into an array of B input values that share the same twiddle factor $W^k$. For example, consecutive input data values $B[(N/2)+p]_n$ and $B[(N/2)+p+1]_n$ might correspond to points (4 and 5) or (6 and 7) at stage 0 in FIG. 1. In large FFT calculations the twiddle factor seldom updates until the later stages of the calculation.

During a complex multiply used in the radix-2 FFT butterfly, an instruction (provided by an external processor not shown in the figures) selects the following operands for the four multiplies by multipliers 208(a)-208(d): xl*yl, xh*yh, xh*yl, and xl*yh, where "*" is a multiplication, xl designates the lower half of value x in X register 203, xh designates the upper half of value x in X register 203, yl designates the lower half of value y in Y register 204, yh designates the upper half of value y in Y register 204. The "lower half" and the "upper half" refer to real and imaginary parts of the data point, respectively. The results of the four multiplies are stored in product registers 209.

Concurrent with the first complex multiply for an adjacent pair of butterfly calculations, an instruction copies the data stored in Z register 205 to Y register 204 in preparation for the second complex multiply. Auxiliary registers (0, 1) 210 receive and store consecutive data points $A[p]n$ and $A[p+1]_n$. For example, consecutive input data values $A[p]_n$ and $A[p+1]_n$ might correspond to points (0 and 1) or (2 and 3) at stage 0 in FIG. 1.

An instruction selects the following operands for the four adds/subtract operations by combiners 213(a)-213(d): i) for the first butterfly calculation in an adjacent pair, the operands are ar01+p0−p1, ar0h+p2+p3, ar01−p0+p1, ar0h−p2−p3, and for the second butterfly calculation in an adjacent pair, the operands are ar11+p0−p1, ar1h+p2+p3, ar11−p0+p1, ar1h−p2−p3. The elements i) ar01 and ar0h represent the contents of the lower and upper halves of register 0 in auxiliary registers (0,1) 210, ii) ar1l and ar1h represent the contents of the lower and upper halves of register 1 in auxiliary registers (0,1) 210, and p0−p3 represent the results from products of multipliers 208(a)-208(d) stored in product registers 209. In each case, the results of these operations are employed to update the contents of accumulator register file 214.

Consequently, the four results written to group four accumulators comprise the real and imaginary parts of the two outputs of an FFT butterfly calculations. Eight accumulators, therefore, contain at any given time the real and imaginary parts of two butterfly calculation results (two butterflies*two results/butterfly*real, imaginary parts/result=8 accumulators).

For a preferred embodiment of the exemplary radix-2 FFT butterfly architecture 200 of FIG. 2, connections to memory might comprise the following structure. All data buses (e.g., X (read) bus 201, Y (read) bus 202, and Y (write) bus 202) are 64 bits wide. X register 203 receives a complex twiddle factor wk from either X (read) bus 201 or Y (read) bus 202. Y register 204 and Z register 205 load as a combined entry with consecutive complex input data points $B[N/2+p]_n$ and $B[N/2+p+1]_n$. Auxiliary registers (0, 1) 210 receive data as a combined entity with consecutive complex input data points $A[p]_n$ and $A[p+1]_n$. Logic (not shown in FIG. 2) employed to write data aggregates the upper halves of four 32-bit accumulators, where the first two accumulators contain the real or imaginary parts of either $A[p]_n$ or $B[N/2+p]_n$ and the second two accumulators contain the real and imaginary parts of either $A[p+1]_n$ or $B[N/2+p+1]_n$. This pairing of adjacent butterflies allows Y (write) bus 202 to write to memory the results of one butterfly calculation per clock cycle by alternating between writing i) a pair of adjacent results to an upper leg (e.g., the upper halves of four 32-bit accumulators) and ii) a pair of adjacent results to a lower leg (e.g., the lower halves of four 32-bit accumulators) of the butterfly output values in group four accumulators 215.

Figure 3:
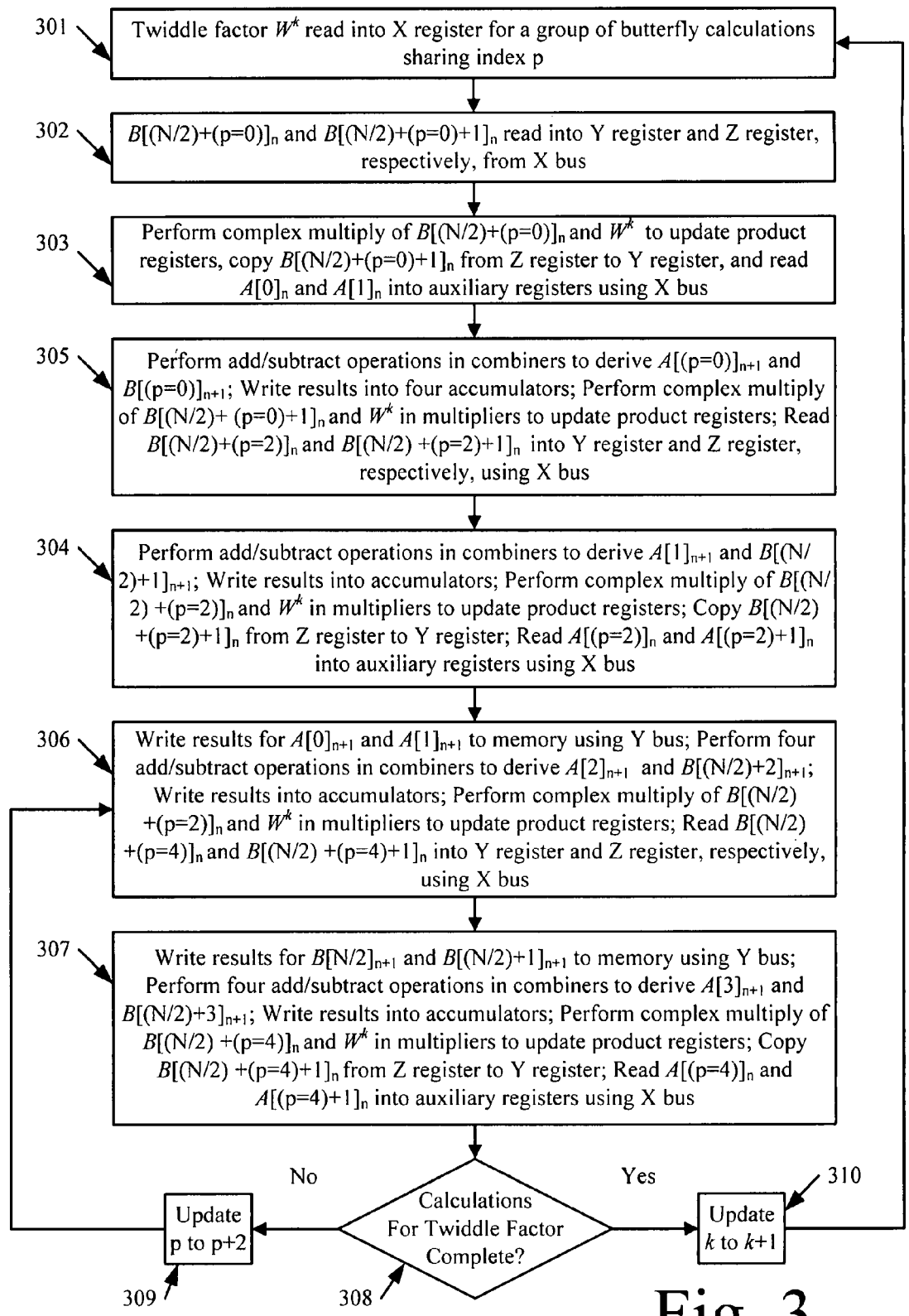
FIG. 3 shows an exemplary method as may be employed by the radix-2 FFT butterfly architecture of FIG. 2.

FIG. 3 shows an exemplary method as may be employed by the exemplary radix-2 FFT butterfly architecture 200 of FIG. 2. During operation, the exemplary method 300 performs the following steps in a pipelined manner to generate updated coefficients at stage n+1 from data points at stage n of the FFT calculation.

At step 301, the twiddle factor $W^k$ is read into X register for a group of butterfly calculations sharing index p (p= 0, 2, 4. . . , P, where P is the maximum value for the index of butterfly calculations associated with the twiddle factor $W^k$). At step 302, the values $B[(N/2)+(p=0)]_n$ and $B[(N/2)+(p=0)+1]_n$ are read into Y register 204 and Z register 205, respectively, from X bus 201. At step 303, complex multiplication of $B[(N/2)+(p=0)]_n$ with the twiddle factor $W^k$ is performed and corresponding results stored in product registers 209. Also, at step 303, $B[(N/2)+(p=0)+1]_n$ is copied from Z register 205 to Y register 204, and $A[(p=0)]_n$ and $A[(p=0)+1]_n$ are read into auxiliary registers (0,1) 210 from X bus 201.

At step 304 the four add/subtract operations are performed in combiners 213(a)-213(d) to derive $A[(p=0)]_{n+1}$ and $B[(p=0)]_{n+1}$ and the results are written into four accumulators of accumulator register file 214 and group four accumulators 215. Also at step 304, the complex multiply of $B[(N/2)+(p=0)+1]_n$ and $W^k$ is performed in multipliers 208(a)-208(d) to update product registers 209, and $B[(N/2)+(p=2)]_n$ and $B[(N/2)+(p=2)+1]_n$ are read into Y register 204 and Z register 205, respectively, using X bus 201.

At step 305, the four add/subtract operations are performed in combiners 213(a)-213(d) to derive $A[1]_{n+1}$ and $B[(N/2)+1]_{n+1}$ and the results are written into accumulator register file 214 and/or group four accumulators 215. Also, at step 305, the complex multiply of $B[(N/2)+(p=2)]_n$ and $W^k$ is performed in multipliers 208(a)-208(d) to update product registers 209; $B[(N/2)+(p=2)+1]_n$ is copied from Z register 205 to Y register 204; and $A[(p=2)]_n$ and $A[(p=2)+1]_n$ are read into auxiliary registers (0,1) 210 using X bus 201.

At step 306, the results for $A[0]_{n+1}$ and $A[1]_{n+1}$ are written to memory (not shown in FIG. 2) using Y bus 202, four add/subtract operations are performed in combiners 213(a)-213(d) to derive $A[2]_{n+1}$ and $B[(N/2)+2]_{n+1}$ with the results written into accumulator register file 214 and/or group four accumulators 215. Also, at step 306, the complex multiply of $B[(N/2)+(p=2)]_n$ and $W^k$ is performed in multipliers 208(a)-208(d) to update product registers 209, and $B[(N/2)+(p=4)]_n$ and $B[(N/2)+(p=4)+1]_n$ are read into the Y register 204 and Z register 205, respectively, using X bus 201.

At step 307, the results for $B[N/2]_{n+1}$ and $B[(N/2)+1]_{n+1}$ are written to memory (not shown in FIG. 2) using Y bus 202, four add/subtract operations are performed in combiners 213(a)-213(d) to derive $A[3]_{n+1}$ and $B[(N/2)+3]_{n+1}$ and the results written into accumulator register file 214 and/or group four accumulators 215. Also, at step 307, the complex multiply of $B[(N/2)+(p=4)]_n$ and $W^k$ is performed in multipliers 208(a)-208(d) to update product registers 209, $B[(N/2)+(p=4)+1]_n$ is copied from Z register 205 to Y register 204, and $A[(p=4)]_n$ and $A[(p=4)+1]_n$ are read into auxiliary registers (0,1) 210 using X bus 201.

At step 308, a test determines whether all butterfly calculations for the twiddle factor $W^k$ are complete. If the test of step 308 determines that not all butterfly calculations for the twiddle factor $W^k$ are complete, the method updates p to p+2 at step 309 and then returns to step 306. If the test of step 308 determines that all butterfly calculations for the twiddle factor $W^k$ are complete, the method updates k to k+1 at step 310 for the next twiddle factor $W^{k+1}$ and returns to step 301.

Table 1 summarizes an exemplary embodiment of the method shown in FIG. 3, where selected operations are associated with a corresponding clock cycle for the first seven clock cycles of the algorithm and the method begins with p=0.

TABLE 1

| Clock Cycle | Operations |
|---|---|
| 1 | Read the twiddle factor $W^k$ into x for a group of butterfly calculations. |
| 2 | Read $B[N/2]_n$ and $B[(N/2)+1]_n$ into the Y and Z registers, respectively, using the X bus. |
| 3 | Perform the complex multiply of $B[N/2]_n$ and $W^k$ to update the product registers, copy $B[(N/2)+1]_n$ from the Z register to the Y register, and read $A[0]_n$ and $A[1]_n$ into the auxiliary registers using the X bus. |
| 4 | Perform the four adds/subtracts to derive $A[0]_{n+1}$ and $B[0]_{n+1}$ and write the results to four accumulators, perform the complex multiply of $B[(N/2)+1]_n$ and $W^k$ to update the product registers, and read $B[(N/2)+2]_n$ and $B[(N/2)+3]_n$ into the Y and Z registers, respectively, using the X bus. |
| 5 | Perform the four adds/subtracts to derive $A[1]_{n+1}$ and $B[(N/2)+1]_{n+1}$ and write the results into four accumulators, perform the complex multiply of $B[(N/2)+2]_n$ and $W^k$ to update the product register, copy $B[(N/2)+3]_n$ from the Z register to the Y register, and read $A[2]_n$ and $A[3]_n$ into auxiliary registers using the X bus. |
| 6 | Write the results for $A[0]_{n+1}$ and $A[1]_{n+1}$ to memory using the Y bus, perform the four adds/subtracts to derive $A[2]_{n+1}$ and $B[(N/2)+2]_{n+1}$ and write the results to four accumulators, perform the complex multiply of $B[(N/2)+2]_n$ and $W^k$ to update the product registers, and read $B[(N/2)+4]_n$ and $B[(N/2)+5]_n$ into the Y and Z registers, respectively, using the X bus. |
| 7 | Write the results for $B[N/2]_{n+1}$ and $B[(N/2)+1]_{n+1}$ to memory using the Y bus, perform the four adds/subtracts to derive $A[3]_{n+1}$ and $B[(N/2)+3]_{n+1}$ and write the results to four accumulators, perform the complex multiply of $B[(N/2)+4]_n$ and $W^k$ to update the product registers, copy $B[(N/2)+5]_n$ from the Z register to the Y register, and read $A[4]_n$ and $A[5]_n$ into the auxiliary registers using the X bus. |

The operations in clock cycles 6 and 7 of Table 1 loop repetitively for subsequent clock cycles until the FFT algorithm requires a change in the twiddle factor value. Consequently, the method shown in FIG. 3, and as outlined in Table 1, produces a peak calculation rate of one butterfly calculation per clock cycle after the $7^{th}$ clock cycle. The above description applies for FFT calculation updating coefficients, for example, between stage 0 and stage 1. For some embodiments of the present invention, as needed, an external processor might account for the shuffling of data points at each stage of the FFT calculation and modify the indexing of the data points accordingly.

Embodiments of the present invention might provide for the following advantages. FFT calculation performance might be dramatically accelerated by executing a radix-2 FFT butterfly in one clock cycle under peak conditions. Embodiments of the present invention take advantage of a 3-operand addition/subtraction to collapse the number of individual FFT calculations. Embodiments of the present invention employ a small number of dedicated registers to augment the register set for FFT functions, limiting the number of general-purpose accumulator registers to 8, a figure that simplifies instruction encoding for the DSP. Embodiments of the present invention exploit pairing of operands to desirably employ only two data buses (X and Y read/write buses) to both read operand values and write results. Embodiments of the present invention support "in-place" calculation of the FFT to minimize memory requirements, and only require modest hardware growth (15-20%) relative to a dual-MAC DSP. All instruction types fit within a 32-bit encoding architecture to yield superior code density, while reducing or eliminating impairment of operating frequency relative to a dual-MAC DSP.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state, memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

I claim:

1. A circuit for generating updated Fast Fourier Transform (FFT) coefficients with a butterfly, the circuit comprising:
    a set of storage registers storing a twiddle factor, a first A coefficient and a first B coefficient for a current stage, wherein the twiddle factor, the first A coefficient, and the first B coefficient are complex-valued;
    a set of multipliers configured to combine the twiddle factor and the first B coefficient to provide an updated product register value, wherein the product register value is stored in a product register of the set of storage registers; and
    a set of combiners configured to derive a first pair of updated FFT coefficients for a subsequent stage with add/subtract operations based on the first A coefficient, first B coefficient, and the product register value,
    wherein the set of storage registers stores one or more subsequent A coefficients and one or more subsequent B coefficients corresponding to the twiddle factor, and the set of multipliers and the set of combiners are further configured so as to provide one or more subsequent updated FFT coefficients, wherein the circuit is configured to provide each pair of FFT coefficients in one clock cycle.

2. The invention of claim 1, wherein the circuit is configured to update the twiddle factor and to generate new updated FFT coefficients for a new first A coefficient and a new first B coefficient corresponding to the updated twiddle factor.

3. The invention of claim 1, wherein the circuit further comprises:
    a first operand selector configured to select, based on a first instruction, a first operand corresponding to the butterfly calculation, wherein the set of multipliers updates the product register with the first operand, and a second operand selector configured to select, based on a second instruction, a second operand corresponding to the butterfly calculation, wherein the set of combiners derives the first pair of updated FFT coefficients with the second operand.

4. The invention of claim 1, wherein:

concurrent with the set of multipliers combining the twiddle factor and the first B coefficient, the set of storage registers receives a second A coefficient, and concurrent with the set of combiners deriving a first pair of updated FFT coefficients for a subsequent stage with add/subtract operations based on the first A coefficient, first B coefficient, and the product register value, the set of storage registers receives a second B coefficient.

5. The invention of claim 4, wherein the circuit generates a second pair of updated FFT coefficients for the second A coefficient and the second B coefficient.

6. The invention of claim 5, wherein:

concurrent with the set of multipliers combining the twiddle factor and the second B coefficient, the set of storage registers receives a third A coefficient, and concurrent with the set of combiners deriving a second pair of updated FFT coefficients for a subsequent stage with add/subtract operations based on the second A coefficient, second B coefficient, and the product register value, the set of storage registers receives a third B coefficient.

7. The invention of claim 6, wherein, while the circuit generates a third pair of updated FFT coefficients for the third A coefficient and the third B coefficient while concurrently receiving subsequent A and B coefficients, the circuit is further configured to provide each pair of FFT coefficients in one clock cycle for the subsequent A and B coefficients.

8. The invention of claim 4, wherein the first and the second A coefficients represent a pair of input A-FFT coefficients, and the first and the second B coefficients represent a pair of B-FFT coefficients, the pair of input A-FFT coefficients and the pair of B-FFT coefficients being processed sequentially, allowing for update of adjacent butterflies.

9. The invention of claim 1, wherein the circuit is embodied in an integrated circuit chip.

10. A method of generating updated Fast Fourier Transform (FFT) coefficients with a butterfly, the method comprising the steps of:

(a) reading a twiddle factor;

(b) reading a first A coefficient and a first B coefficient for a current stage, wherein the twiddle factor, the first A coefficient, and the first B coefficient are complex-valued;

(c) updating a product register value including the step of multiplying the first B coefficient with the twiddle factor;

(d) deriving a first pair of updated FFT coefficients for a subsequent stage with add/subtract operations based on the first A coefficient, first B coefficient, and the product register value; and (e) repeating steps (a) through (d) for one or more subsequent A coefficients and one or more subsequent B coefficients corresponding to the twiddle factor to provide one or more subsequent updated FFT coefficients, wherein the method repeats the steps in a manner so as to provide each pair of FFT coefficients in one clock cycle.

11. The invention of claim 10, further comprising the steps of updating the twiddle factor and repeating steps (a) through (d) for a new first A coefficient and a new first B coefficient.

12. The invention of claim 11, further comprising the steps of: selecting, based on a first instruction, a first operand corresponding to the butterfly calculation, wherein step (c) updates the product register with the first operand, and selecting, based on a second instruction, a second operand corresponding to the butterfly calculation, wherein step (d) derives the first pair of updated FFT coefficients with the second operand.

13. The invention of claim 10, wherein:

concurrent with step (c), the method reads a second A coefficient, and concurrent with step (d), the method reads a second B coefficient.

14. The invention of claim 13, comprising the step of repeating steps (c) and (d) for the second A coefficient and the second B coefficient to generate a second pair of updated FFT coefficients.

15. The invention of claim 14, wherein:

concurrent with repeating step (c) for the second B coefficient, the method reads a third A coefficient, and concurrent with repeating step (d) for the second A coefficient and the second B coefficient, the method reads a third B coefficient.

16. The invention of claim 15, wherein the method repeats steps (c) and (d) for the third B coefficient while concurrently reading subsequent A and B coefficients, the method continuing to repeat steps (c) and (d) for the subsequent A and B coefficients and in a manner so as to provide each pair of FFT coefficients in one clock cycle.

17. The invention of claim 13, wherein each of the first and the second A coefficients represent a pair of input A-FFT coefficients, and the first and the second B coefficients represent a pair of B-FFT coefficients, the pair of input A-FFT coefficients and the pair of B-FFT coefficients being processed sequentially, allowing, for steps (c) and (d), the step of updating adjacent butterflies.

* * * * *